United States Patent Office 3,473,386
Patented Oct. 21, 1969

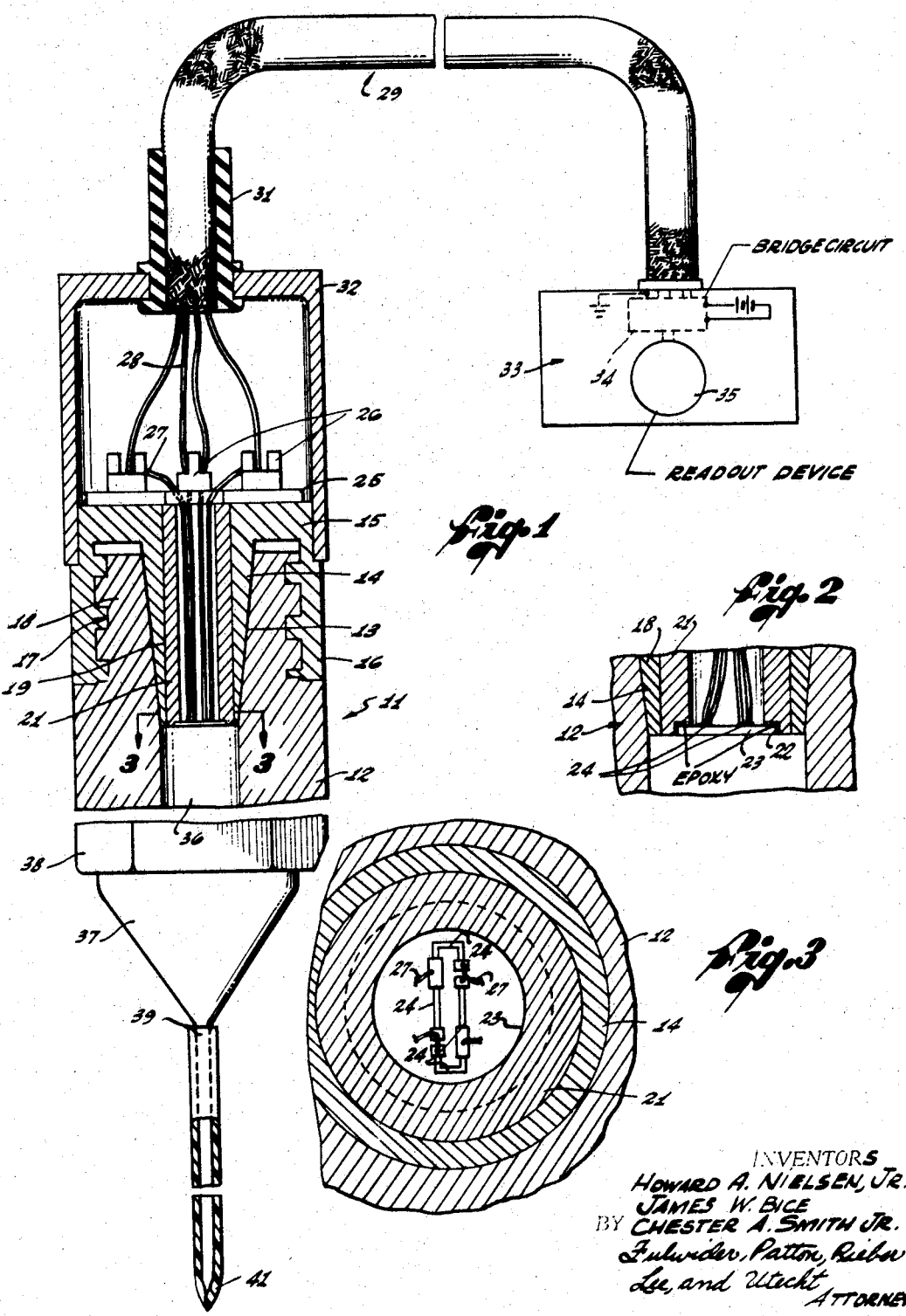

3,473,386
FLUID FITTING MOUNTED PRESSURE TRANSDUCER
Howard A. Nielsen, Jr., Altadena, James W. Bice, Santa Susanna, and Chester A. Smith, Jr., Burbank, Calif., assignors to Electrometric Incorporated, Altadena, Calif., a corporation of California
Filed Dec. 4, 1967, Ser. No. 687,756
Int. Cl. G01l 9/00, 1/22; A61b 5/02
U.S. Cl. 73—398      7 Claims

ABSTRACT OF THE DISCLOSURE

A bonded strain gauge pressure transducer mounted in a standard tubular connective fitting, specifically a hospital type B and D Luer-lok fitting, modified to mount a flexible diaphragm which supports the strain gauges bonded thereto. The pressure side of the fitting connects to flexible tubing leading to a catheter or the like, by which may be measured respiratory pressures and instantaneous blood pressure, as in cardiac catheterization. The strain gauges are bonded to a flexible diaphragm mounted across the end of a hollow post forming the male member of the pressure-type connection of the fitting. While the strain gauges may be resistance wire, foil or semi-conductor filaments cemented to aluminum, steel or other elastic materials of dimensions to flex in the range of pressures being measured, it is preferred to use an elastic monocrystalline silicon substate having piezo-resistive elements as semi-conductor stress sensors bonded thereto by solid state diffusion or epitaxial growth techniques. The bonded strain gauges desirably place elements in both compression and tension and electrical leads from the elements are carried in a shielded cable to a resistance-sensitive circuit, such as a Wheatstone bridge, the output of which is fed to a read-out device such as an oscilloscope or a recorder making a permanent record of the pressure values being measured.

BACKGROUND OF THE INVENTION

The present invention is in the field of bonded strain gauge pressure transducers, more particularly, for the measurement of physiological pressures, such as respiratory, venous and arterial pressures for human beings and animals.

Present designs of physiological pressure transducers are of considerable size and weight with a relatively large internal volume which interferes with the mechanical and acoustic responses and encourages the inclusion of air bubbles. Present transducer equipment can be readily damaged and normally requires special supports. Also, the output of existing physiological pressure transducers is considerably lower than desired for quickly obtaining reliable data of the condition being measured.

SUMMARY OF THE INVENTION

The present invention provides an improved pressure transducer giving better and more reliable data obtained in less time; for example, in operating rooms, physiological laboratories and intensive care units. The transducer of this invention is rugged, of small internal volume and displacement, and has several times higher output than existing standard units. Its mounting in a standard hospital fitting permits the use of inexpensive adapters for different physiological requirements. The elastic flexing member to which the strain gauges are bonded is in the form of a thin, flexible, diaphragm-disc supported across the opening through the male post of a standard hospital fluid fitting. Thin flexible leads from the bonded strain gauge elements are connected to the conductors of a shielded cable leading to a Wheatstone bridge circuit which feeds to a read-out device. The strain gauge elements may be resistance wire, foil, semi-conductor filaments and the like cemented to any elastic material for the flexing diaphragm, such as aluminum, steel or other elastic materials, but the invention produces a more sensitive transducer by employing a diaphragm of a monocrystalline silicon substrate which is substantially a perfect elastic material and has semi-conductor stress sensors atomically bonded thereto by solid state diffusion and/or epitaxial growth techniques. With this type of strain gauge, the transducer can be of quite small physical size to fit within the standard hospital fitting, is substantially linear in response, and has very little hysteresis and acceleration sensitivity. It is resistant to shock and chemically inert to normal hospital materials, while being highly sensitive and accurate to changes in the pressure being measured.

BRIEF DESCRIPTION OF THE DRAWINGS

FIGURE 1 is a view of a physiological pressure transducer fitting according to the present invention in a system including a catheter, bridge circuit and read-out device, and with the transducer portion of the fitting shown in section;

FIGURE 2 is an enlarged sectional view of the portion of the fitting supporting the elastic diaphragm carrying the strain gauges; and FIGURE 3 is an enlarged transverse sectional view on line 3—3 of FIGURE 1.

DESCRIPTION OF THE PREFERRED EMBODIMENTS

The pressure transducer of the present invention is shown mounted in a standard hospital-type fluid fitting such as a B & D Luer-lok fitting indicated generally at 11. The fitting is formed of two metal parts, one of which, 12, has a conical socket 13 therein into which fits a complementary conical post 14 extending centrally of the other part 15. The part 15 has a skirt 16 surrounding the post 14 which interlocks at the threads 17 with similar threads on the exterior of an extension 18 of the part 12 within which the conical seat 13 is disposed. By means of the interlocking or threaded portions 17, the two parts 12 and 15 are firmly held together with the conical post 14 engaging the conical socket 13 in fluid sealing relation along their surfaces.

The post 14 has a central bore 19 therethrough for the passage of fluid in the normal fitting. This is modified to receive an Invar tube 21 by press-fit, cementing or other fluid-tight connection, and the end of the tube 21 has a counterbore 22 therein forming a seat within which is cemented an elastic flexible diaphragm 23 by any desired cement, such as an epoxy resin as indicated in FIGURE 2. On the back surface of the diaphragm 23 are mounted strain gauge elements 24. It is to be understood that the diaphragm 23 could be mounted at the opposite end of the tube 21, but it is preferred to mount it at the pressure end for greater strength and a lesser volume of fluid required in the transducer.

Against the back face of part 15 is mounted an insulating terminal board 25 carrying connectors 26 thereon to which are connected fine flexible leads 27 leading from the connectors 26 to the ends of the strain gauge elements 24. Also connected to the connecters 26 are the ends of conductors 28 from a flexible cable 29 of shielded construction which passes through a flexible bushing 31 mounted in a cap 32 on the part 15 and enclosing the connecters 26. The cable 29 leads to an electrical unit 33 including a bridge circuit 34 and a read-out device 35 in the form of an oscilloscope or a permanent recorder of any type.

The pressure end of the fitting part 12 has a bore 36 therethrough from the socket 13 and has its end connected to a reducing fitting 37, as by a threaded cap 38. On the reducing fitting 37 is slipped a flexible tube 39 which in turn is connected to a catheter or which itself has an integral catheter end 41 for insertion into a blood vessel.

As previously stated, the bonded strain gauge elements of the transducer of this invention can be of many forms, including resistance wires, foil and semi-conductor filaments, which can be attached to a diaphragm 23 of aluminum, steel or other elastic material by cementing, by vapor deposition or by other techniques. However, for accuracy, sensitivity and direct stress transmittal, it is preferred to use a diaphragm 23 of monocrystalline silicon substrate to which piezo-resistive elements are atomically bonded, to form semi-conductor stress sensors, by solid state diffusion or epitaxial growth techniques in known matter. The stress sensors then become an integral and inseparable part of the silicon substrate and do not depend on non-elastic materials to transmit strain to them. The monocrystalline silicon substrate is theoretically a perfect elastic material and stresses are transmitted to the sensing elements through atomic bonds which preclude slip, non-repeatability and other types of inelastic behavior. The sensing elements are desirably extremely thin, of the order of 0.00001″ to 0.0001″ in thickness, thereby giving high resistance per unit length and permitting small physical size. The strain gauge elements may be of any desired number, preferably four as shown in FIGURE 3, with two placed in tension and two in compression as the diaphragm flexes, for increased sensitivity in the bridge circuit.

The pressure transducer according to the present invention secures better and more reliable data of physiological pressures in an instrument of small size and weight and having small internal volume and volume displacement. It preferably utilizes a standard hospital fitting modified to receive therein the flexing diaphragm mounting the bonded strain gauges. The transducer is rugged and shock-resistant; inert to normal hospital chemicals; has low acceleration and thermal sensitivity; is substantially linear is response; and has very low hysteresis. The fitting mounting permits the use of relatively inexpensive adapters for various physiological requirements.

While certain preferred embodiments of the present invention have specifically been illustrated and described, it is to be understood that the invention is not limited thereto, as many variations will be apparent to those skilled in the art, and the invention is to be given its broadest interpretation.

What is claimed is:
1. A pressure transducer comprising:
a fluid fitting having a socket part and a post part fitting into said socket in fluid-tight relation;
a passage through said socket part;
a passage through said post part;
means for connecting said socket part passage to a source of fluid pressure to be sensed;
a flexible diaphragm closing the passage through said post part in fluid-tight relation, one face of said diaphragm being in communication with the passage through said socket part to cause flexing of said diaphragm upon change in the pressure in said socket part passage;
bonded strain gauge elements on the opposite face of said diaphragm;
flexible circuit means connected to said strain gauge elements; and
a tube mounted in said post part passage in fluid-tight relation, said diaphragm being in the form of a disc toward which fluid pressure is applied, mounted in sealing relation across the end of said tube, said diaphragm being supported solely by said end of said tube independently of other fitting parts to isolate the diaphragm from strain other than applied by the fluid pressure.

2. The pressure transducer defined in claim 1 in which:
the diaphragm supporting end of said tube has a counterbore therein providing a seat within which the flexible diaphragm is cemented in fluid-tight relation.

3. The pressure transducer defined in claim 1, in which:
said fitting is of the quick-disconnect type; and
said socket and post parts have complementary tapered, interengaging surfaces effecting a fluid-tight connection.

4. A pressure transducer comprising:
a fluid fitting having a socket part and a post part fitting into said socket in fluid-tight relation;
a passage through said socket part;
a passage through said post part;
means for connecting said socket part passage to a source of fluid pressure to be sensed;
a flexible diaphragm closing the passage through said post part in fluid-tight relation, one face of said diaphragm being in communication with the passage through said socket part to cause flexing of said diaphragm upon change in the pressure in said socket part passage;
bonded strain gauge elements on the opposite face of said diaphragm;
flexible circuit means connected to said strain gauge elements; and
means positively holding said fitting parts together to force said post and socket parts into a surface-to-surface, fluid-tight connection, said socket and post parts being complementarily tapered to provide conical interior and exterior surfaces engaging substantially throughout their length to effect a fluid-tight connection.

5. The pressure transducer defined in claim 4 in which:
said strain gauge elements are diffused onto an elastic flexible diaphragm.

6. The pressure transducer defined in claim 4 in which:
said diaphragm is a monocrystalline silicon substrate and said elements are semi-conductor stress sensors atomically bonded to the diaphragm as an integral and inseparable part thereof.

7. In combination with the pressure transducer of claim 4:
a bridge circuit including said strain gauge elements whose output is varied by change in the resistance of said strain gauge elements; and
a read-out device responsive to the output of said bridge circuit.

References Cited

UNITED STATES PATENTS

| 3,244,006 | 4/1966 | Delmonte | 73—398 |
| 3,247,719 | 4/1966 | Chelner | 73—398 XR |
| 3,305,818 | 2/1967 | Brueggeman et al. | 73—398 XR |

DONALD O. WOODIEL, Primary Examiner

U.S. Cl. X.R.
178—2.05; 338—4